Aug. 10, 1954     K. F. N. ZETTERBERG     2,686,058
WORKHOLDER FOR MACHINE TOOLS
Filed Oct. 20, 1951                                 2 Sheets-Sheet 1
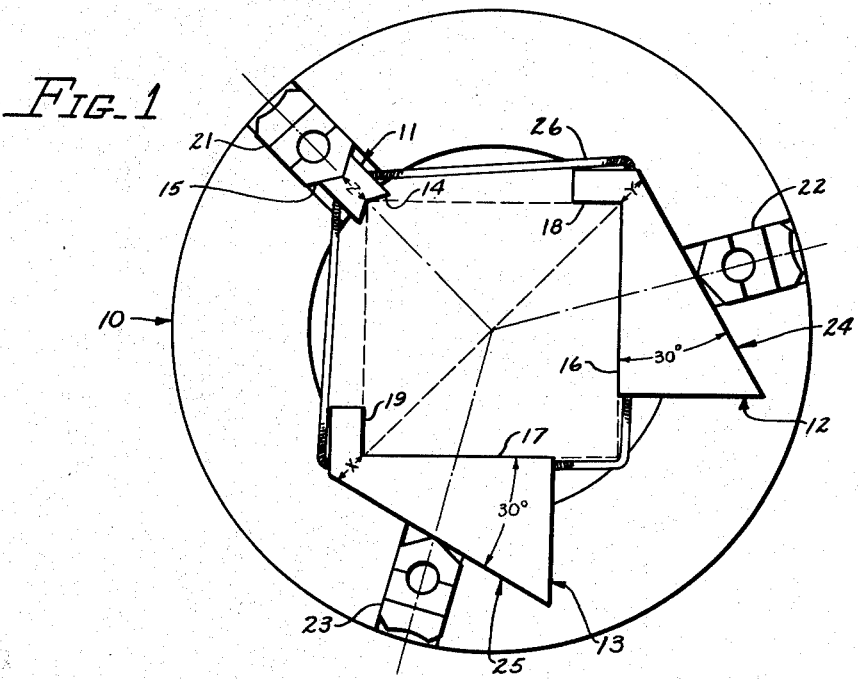
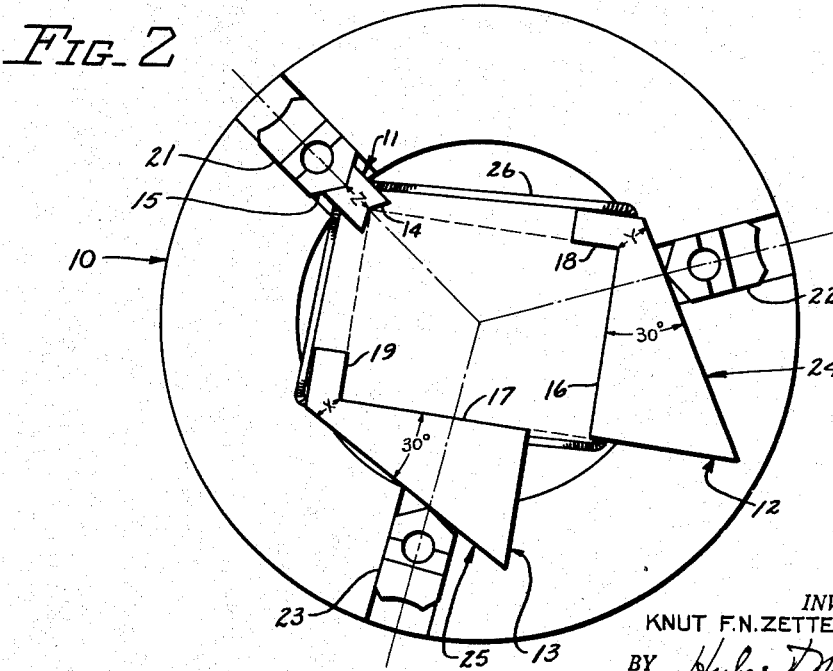
INVENTOR.
KNUT F.N. ZETTERBERG
BY Hubert Miller
ATTORNEY Aug. 10, 1954  K. F. N. ZETTERBERG  2,686,058
WORKHOLDER FOR MACHINE TOOLS
Filed Oct. 20, 1951  2 Sheets-Sheet 2
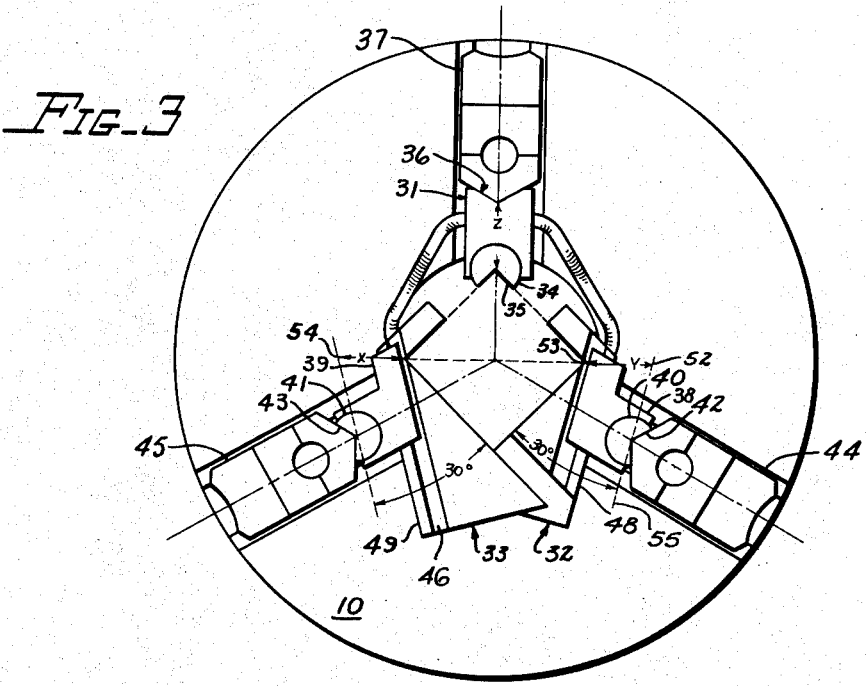
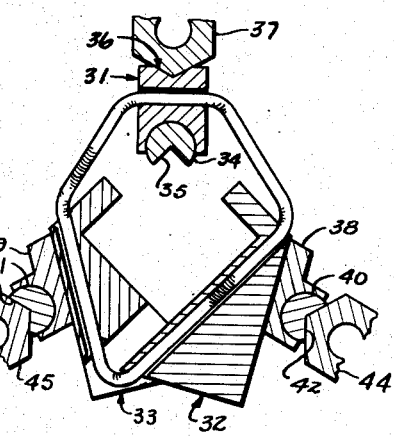
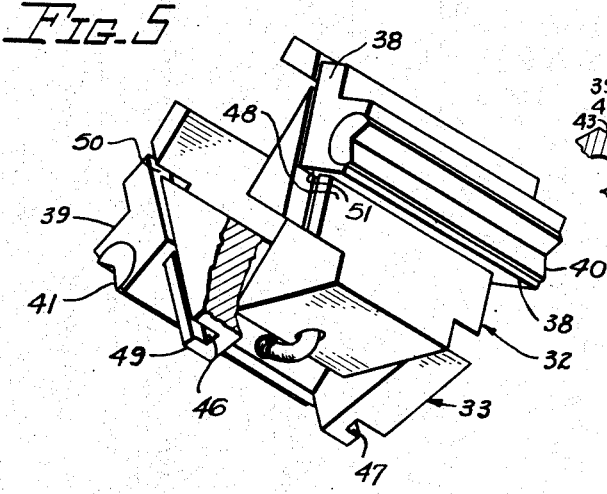
KNUT F. N. ZETTERBERG
INVENTOR.
BY *Hubert Miller*
ATTORNEY Patented Aug. 10, 1954

2,686,058

UNITED STATES PATENT OFFICE 2,686,058

WORKHOLDER FOR MACHINE TOOLS

Knut F. N. Zetterberg, Wichita, Kans.

Application October 20, 1951, Serial No. 252,377

8 Claims. (Cl. 279—123)

This invention relates to machine tool work holding mechanisms, and more particularly to a work holding adapter for three jaw chucks.

It is an accepted fact that conventional three jaw chucks are incapable, without modification, of gripping and holding square or rectangular bar stock. When work pieces of such cross sectional shape are to be machined, it is necessary for the operator to either spend precious hours making specially designed chuck fittings—one for each different size and shape of bar stock, or to remove the three jaw chuck and install a four jaw chuck on the power tool. Either practice is costly in time and in money invested.

It is the chief object of this invention to provide a work holder capable of receiving radial forces along three equally spaced radially converging lines, as from the jaws of a universal three jaw chuck, and of holding and automatically centering both square and rectangular cross section work pieces of various dimensions and proportions, in response to such applied forces.

The invention, together with other objects attending its production will be more clearly understood when the following description is read in connection with the accompanying drawings, in which:

Fig. 1 is an end view of one embodiment of the adapter holding a square cross section work piece in a three jaw chuck;

Fig. 2 is a similar view illustrating the manner in which a rectangular cross section work piece is held and centered in a three jaw chuck;

Fig. 3 is an end view illustrating a different embodiment of the adapter holding and centering a square cross section work piece in a three jaw chuck;

Fig. 4 is a lateral sectional view through the adapter of Fig. 3, the chuck jaws being shown fragmentarily;

Fig. 5 is a perspective view of certain parts of the adapter of Fig. 3, and shows details of construction.

Referring to Figs. 1 and 2 of the drawings it will be seen that a simple yet practical form of the invention comprises three work piece engaging members 11, 12 and 13, the inner edges of which are adapted to cooperate in substantially embracing the four corners of a square or rectangular work piece, and the outer or opposite edges of which are adapted to engage the jaws of a conventional chuck 10 or other mechanism capable of applying force from three directions toward a common center. The three jaws of the chuck are identified by the numerals 21, 22, and 23. The thickness of the members 11, 12, and 13 is preferably substantially equal to the thickness of the chuck jaws, measured along the contacting edges of the jaws.

Member 11 is a corner contact member, the inner edge of which has a shallow V-shaped seat 14 for seating on the corner of a work piece, and the outer edge of which has a similar seat 15 for contacting one chuck jaw 21.

Members 12 and 13 are similarly made from larger blocks of metal, and their respective inner edges include long work contacting planar surfaces 16 and 17, and short work contacting planar surfaces 18 and 19, which are respectively normal to the surfaces 16—17. These two members are of identical configuration in side elevation, but one is used as a right hand and the other as a left hand contact member. The respective outer edges of each of the members 12 and 13 are planar jaw contacting surfaces 24 and 25, and each lies at an angle of 30° to the respective surfaces 16 and 17. As illustrated, these members 12 and 13 are adapted to seat on the opposite corners of a workpiece with the longer surfaces 16 and 17 of each member extendinng toward and substantially embracing a fourth corner of the work. Thus it can be said that the inner edges of the three members 11, 12, and 13, cooperate to substantially embrace the four corners of a workpiece, whether it be square or rectangular in cross section.

In making the two members 12 and 13, it should be noted that the distances X and Y, measured along a diagonal of an embraced and centered square work piece, should be equal to each other and equal to the distance Z, measured along the other diagonal. It should also be noted that the distance Z is the distance between the point of contact of the member 11 with the corner of the work, and the point of contact of the member 11 with the force applying member, in this case chuck jaw 21. This distance Z may be varied from zero to infinity to suit the designer, so long as the distances X and Y are made equal to Z, and so long as the included angles between the surfaces 16 and 24 and 17 and 25 are 30°. These relationships are necessary to obtain the self-centering function when the invention is used in a three jaw universal chuck—one in which the jaw actuator simultaneously moves all three jaws an equal distance toward or away from a common center. If the defined relationships exist, the chuck jaws 22 and 23 will contact the respective surfaces 24 and 25 at various points depending both on the size of the workpiece and on whether it is square or rectangular in cross section, but the members 12 and 13 will always be the proper thickness at the point of jaw contact to exactly bridge the space between the workpiece surface and the jaw, thus assuring that the center of the workpiece coincides with the rotational center of the chuck—the center defined by the intersection of the paths of travel of the jaws.

As a convenience, but not as an essential feature of the invention, the three members 11, 12, and 13 are bored, as illustrated, and are strung on an endless flexible element 26. This element is preferably a tension coil spring, as illustrated, and is thus capable of extreme elongation, when required.

In using the invention described, the spring 26 is elongated as necessary and the three members 11, 12 and 13 are positioned on the corners of the workpiece surface as illustrated, and the spring 26 holds them firmly in position. The entire assembly is then positioned in the chuck 10 with jaw 21 seated in seat 15 of member 11. The chuck jaws are then actuated until jaws 22 and 23 contact sloping surfaces 24 and 25. So long as the jaws are equidistant from the common point of intersection of their paths of travel, the workpiece will be properly centered in the chuck. It should be noted that the members 11, 12, and 13 are held in position only by the chuck jaws and by the workpiece. These members are not connected to the chuck jaws in any manner, but are removable with the workpiece when jaw pressure is relieved.

Referring now to Figs. 3 to 5, a refined embodiment of the invention will be described. The three workpiece engaging members are designated as a whole by the numerals 31, 32 and 33, and correspond respectively to members 11, 12, and 13.

Member 31 is provided at its inner edge with a quasi-cylindrical rockable element 34 which includes a right angled workpiece seat 35. Thus when a rectangular workpiece is gripped, as in Fig. 3, the element 34 may freely rotate so that the seat 35 complementally seats a workpiece corner, while the seat 36 also complementally seats the chuck jaw 37.

The respective outer or sloping edges of members 32 and 33 are provided with slidable force transmitting blocks 38 and 39, the outer ends of which carry rockable jaw contacting elements 40 and 41 having seats 42 and 43 formed to complementally receive the jaws 44 and 45. To this end the opposite sides of members 32 and 33 are provided with grooves 46 and 47 (Fig. 5) adjacent and parallel to the respective outer sloping surfaces 48 and 49. These grooves complementally receive parallel inwardly projecting ribs 50 and 51 formed at the ends of each of the blocks 38 and 39.

With this arrangement each chuck jaw seats firmly in a complementally shaped seat, and does not have to depend on direct contact with a sloping surface. The jaw seats 36, 42 and 43 may be shaped to receive any type of chuck jaw. Jaw forces are transmitted through elements 40 and 41 through blocks 38 and 39, through members 32 and 33, to the workpiece.

As in the previously described embodiment, if it is desired that the adapter automatically center workpieces of various sizes and shapes in a universal three jaw chuck, the distances X, Y and Z must be equal. The point 52 is defined by the intersection of a line 55 passing through the jaw contact point in seat 42 parallel to surface 48, and the extended diagonal of an embraced and centered square workpiece. The point 53 is the corner embraced by member 32. Point 54 is similarly defined. The included angle between the line 55 and the adjacent work piece surface is 30°.

As in the previously described embodiment, the members 31, 32, and 33 are bored and strung on a coil spring 56 for ease in handling and using the device. The actual use has been outlined above in connection with the first described embodiment. In this connection it should be noted that if the self-centering feature is not desired, the angle of 30° previously mentioned, may be increased or decreased, as desired, and the equal relationship between the distances X, Y, and Z does not have to be maintained.

Having described two embodiments of the invention with sufficient clarity to enable those familiar with this art to construct and use it, I claim:

1. A work holder for holding and automatically centering square and rectangular cross section work pieces of various sizes in a three jaw chuck comprising: a pair of right and left hand similarly shaped substantially triangular work engaging blocks each having an inner edge made up of one long and one short work piece engaging planar surfaces arranged at right angles to each other, the respective inner edges of the two blocks being capable of cooperating to substantially embrace two diagonally opposite corners and at least a portion of two adjacent surfaces of square and rectangular cross section work pieces of various sizes, each block having a sloping outer edge which lies in a plane which intersects the plane of the respective longer work piece engaging surface of the inner edge of the block at an acute angle; and a third work engaging block having a substantially V-shaped seat in its inner edge for receiving and seating a work piece corner which is diagonally opposite said two adjacent surfaces, and having a similar chuck jaw engaging seat in its outer edge.

2. The invention described in claim 1 in which the said acute angles are each exactly 30° angles.

3. The invention described in claim 1 in which the distance between the apex of the right angle formed by the work engaging surfaces of each of the said pair of blocks, and the adjacent sloping surface of each block, measured along a line bisecting the said right angle, is exactly equal to the distance between the corner seat and the jaw seat in the third block, and in which the said acute angles are each exactly 30°.

4. A work holder for holding square and rectangular cross section workpieces of various sizes in a three jaw chuck comprising: a pair of associated work engaging blocks having cooperating right angled inner edges adapted to embrace two diagonally opposite corners and a laterally extending portion of two adjacent surfaces of a workpiece; a chuck jaw engaging member mounted on and movable along the outer edge of each block; and a third associated work engaging block having a work piece corner engaging seat on its inner edge, and a chuck jaw engaging seat on its outer edge.

5. A work holder for holding and automatically centering square and rectangular cross section workpieces of various sizes in a three jaw chuck comprising: a pair of associated right and left handed work engaging blocks each having cooperating inner edges respectively made up of two meeting surfaces of unequal length normal to each other, the inner edges of the two blocks together being adapted to embrace two diagonally opposite corners and a laterally extending portion of two adjacent surfaces of a work piece; a chuck jaw engaging member having a sliding engagement with the outer edge of each block, said outer edges lying in planes which respectively intersect the extended longer surface of the inner edge of each block at an acute angle, so that in moving in opposite directions along the outer edge of its respective block each chuck jaw engaging member approaches or recedes from said longer surface; a third associated work engaging block having a work piece corner engaging seat on its inner edge adapted to embrace a work piece corner which is diagonally opposite said two adjacent surfaces; and a chuck jaw engaging seat on the outer edge of said third block.

6. A work holding mechanism for holding square and rectangular cross section workpieces of various sizes in a three-jaw chuck comprising: a pair of work engaging blocks having cooperating right angled inner edges adapted to embrace a portion of four side surfaces and two diagonally opposite corners of a workpiece; a chuck jaw force transmitting member mounted on and movable along the outer edge of each of said blocks; a third work piece corner engaging block having a workpiece engaging seat on its inner edge adapted to embrace a third corner of the workpiece; a chuck jaw seat on the outer edge of the third block; and an endless flexible member on which all three blocks are slidably mounted to articulate them.

7. A work holding mechanism for holding square and rectangular cross section workpieces of various sizes in a three-jaw chuck comprising: a pair of work engaging blocks having cooperating right angled inner edges adapted to embrace two diagonally opposite corners of a workpiece; a chuck jaw force transmitting member mounted on and slidable along the outer edge of each block; a rockable chuck jaw engaging member mounted in the outer edge of each force transmitting member; a third workpiece corner engaging block; a rockable seat carried by the inner edge of said third block for engaging and embracing a third corner of the workpiece; a chuck jaw seat formed in the outer edge of said third block; and an endless flexible member on which all three blocks are slidably mounted to articulate them.

8. A work holding mechanism for accurately centering and holding square and rectangular cross section workpieces of various sizes in a three-jaw chuck comprising: a pair of right and left handed work engaging blocks each having cooperating right angled inner edges respectively composed of two meeting flat surfaces, the respective composite inner edges of the two blocks together being adapted to embrace two diagonally opposite right angled corners of a workpiece; longitudinally disposed grooves in the opposite side surfaces of each block, said grooves being located adjacent and parallel to the outer edge of each block; a chuck jaw force transmitting member having a pair of spaced parallel inwardly projecting ribs slidably mounted in the grooves of each block; a rockable chuck jaw engaging member mounted in the outer edge of each force transmitting member; a third work engaging block; a rockable seat carried by the inner edge of said third block for engaging and embracing a third corner of the workpiece; a chuck jaw seat formed in the outer edge of said third block; and an endless flexible member on which all three of the blocks are slidably mounted.

References Cited in the file of this patent

UNITED STATES PATENTS

| Number | Name | Date |
|---|---|---|
| 92,541 | Peat | July 13, 1869 |
| 1,011,716 | Baker | Dec. 12, 1911 |
| 2,463,292 | McCallion | Mar. 1, 1949 |
| 2,523,374 | Jensen | Sept. 26, 1950 |

FOREIGN PATENTS

| Number | Country | Date |
|---|---|---|
| 3,711 | Great Britain | Feb. 15, 1910 |
| 679,100 | Germany | July 28, 1939 |